UNITED STATES PATENT OFFICE.

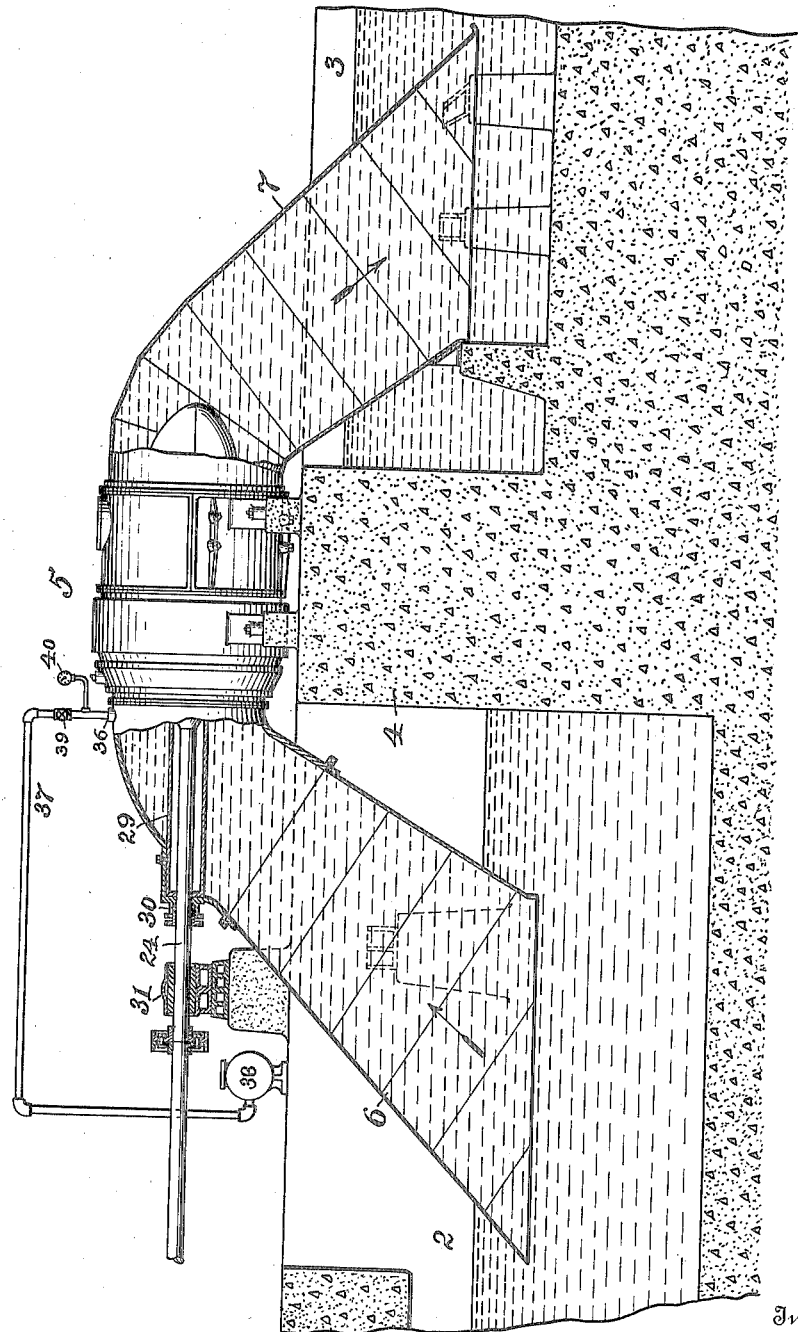

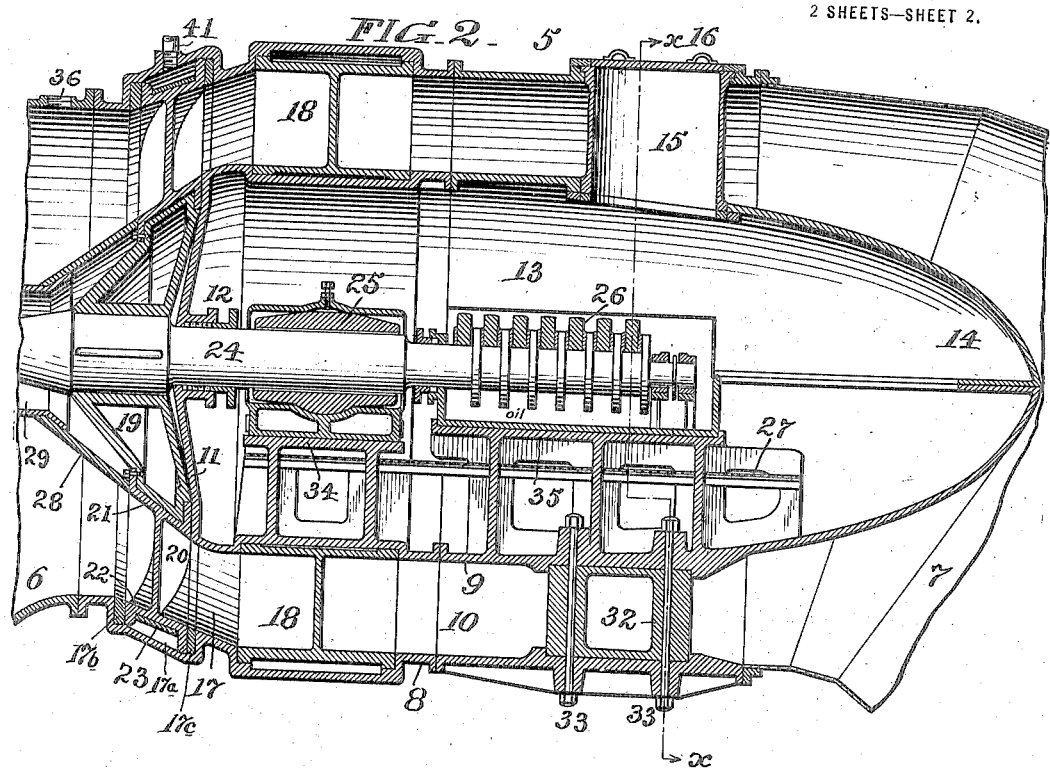

ALBERT BALDWIN WOOD, OF NEW ORLEANS, LOUISIANA.

SCREW-PUMP.

1,345,655.    Specification of Letters Patent.    Patented July 6, 1920.

Application filed July 3, 1913. Serial No. 777,174.

*To all whom it may concern:*

Be it known that I, ALBERT B. WOOD, citizen of the United States, and resident of New Orleans, parish of Orleans, and State of Louisiana, have invented an Improvement in Screw-Pumps, of which the following is a specification.

The object of my invention is to provide a construction of screw pump adapted for impelling water in a continuous manner, such as in sewerage and irrigation systems. More particularly, my object is to so construct the pump that, while in the line of flow of the water, its movable portions may be above the water supply surface and the pump initially started by use of vacuum creating devices for giving to the pump cylinder, inlet and discharge portions the functions of a siphon, whereby the water rises above the normal level and enters the pump so as to be acted upon by the screw impeller or rotor, which could not be relied upon of itself alone to lift the water, but is capable of positively moving the water when brought within the zone of its action.

My object is further, to provide a construction of screw pump in which the impeller shaft extends through a stuffing-box into a closed chamber within the body of the pump, in which is arranged the line and thrust bearings, said chamber being free from water but inclosed by an annular water passage through which the water is pumped; this construction providing protected bearings for the shaft close to the impeller or rotor to insure a minimum vibration and permit access to the chamber during the running of the pump for lubrication, adjustment or other purpose.

My invention also secures other advantageous results, which will appear from the specification when describing the details of construction and operation of my improved pump.

My invention consists of features of construction whereby the foregoing objects may be secured in a screw pump and these, with other more specific features of construction, are fully set out hereinafter and embodied in the claims.

My invention will be better understood by reference to the drawings, in which:—

Figure 1 is a side elevation of a screw pump with part in section and embodying my invention; Fig. 2 is a longitudinal sectional elevation of the upper or main portion of the pumping apparatus; Fig. 3 is a cross section of the same, taken on line $x$—$x$ of Fig. 2; Fig. 4 is an elevation of the annular rotor or impeller; and Fig. 5 is a similar view of the diffusion blades on a smaller scale.

In the use of pumps of the character of this invention, the object has been to cause a flow in pipes or mains in a continuous manner, such as is required in sewerage systems; and to enable the pump to operate, it has been necessary to supply it on the inlet side with water under a static head or pressure, and this necessitated the pump being placed at a relatively low level and considerably below the normal water surface level on the supply side. By my present improvements, I may cause the pump to operate properly when arranged at a considerable elevation above the normal level of the water supply. This I accomplish by extending the intake pipe of the pump down below the surface level of the water on the supply side and also water seal the discharge pipe and create a partial vacuum in the pump at its upper portion, preferably adjacent to the impeller or rotor, which causes the water to flow into the pump and fill it, so that the rotating impeller may take hold of the water and put it into positive circulation. The vacuum may then be maintained automatically by the normal action of the pump.

The foregoing features will be readily understood by referring to Fig. 1, in which 2 is the supply culvert, 3 is the discharge canal, and these are separated by a retaining wall 4. The pump proper is shown at 5 and is supported on the retaining wall above the water level in both the intake culvert and the discharge canal. Extending down from the suction end of the pump body is the intake pipe 6, the lower end of which opens below the water level in the terminus of the culvert 2; and extending down from the discharge end of the pump body is the pipe 7, the lower end of which opens below the water level of the discharge canal 3. The pump is provided with a rotating shaft 24, to which is secured the rotor or impeller 20 which rotates in the pump body. The upper portion of the pump body or casing is provided with a vacuum pipe 37 which is screwed into a tubular boss 36 on the casing; and this pipe is exhausted by a vacuum pump 38. A gage 40 may be used to indicate the extent of the vacuum produced and a valve 39 may be employed to close the pipe 37 when desired, and more particularly when the pump is in operation.

When it is desired to put the pump into operation, the air is exhausted from the pump casing and the water rises through the pipes 6 and 7 to completely fill the body. The impeller may then be put into rotation and cause the water to be propelled through the pump. Of course, if desired, the impeller may be rotating as the priming of the pump with water is taking place, but this is liable to create undesirable disturbance of the water and hamper the free action of the vacuum. By completely filling the pump with water before starting the impeller, the most speedy and desirable result is attained. As shown in Fig. 1, the water is not only circulated by the pump but is lifted over the retaining wall 4 and discharged at a higher level than the level in the intake culvert, so that it may flow through the canal by gravity.

By this construction and arrangement, the screw pump proper is located in the line of flow of the water and above the usual or normal water surface, thereby forming, in effect, a mechanical pipe siphon.

While I have shown the pump intake 6 and discharge 7 opening into a concrete culvert and canal; these pipes may, if conditions require, communicate with water mains of any suitable character.

Referring now more particularly to the interior construction of the pump, 8 is the casing and is cylindrical, with one end connected with the intake pipe 6, the latter being preferably of smaller diameter than the former where they connect with the casing. The casing 8 at its intake end is made conical as at 17, and in which is an annular recess 17ª for the impeller periphery. Arranged within the casing 8, is a hollow interior chamber body having solid walls 9, and providing a water tight compartment 13 closed at the discharge end of the pump in a tapered form and having its other end made with a flattened wall 11 having a stuffing-box 12 through which the impeller shaft 24 extends. This compartment or chamber 13 has communication with the air outside of the pump by a tunnel or man-hole 15, which may be closed on the outside by a cover 16 to keep the dirt out of the chamber.

The body 9 of this inner chamber is preferably elliptical in cross section at its rear portion so as to give greater water space at this portion where it is secured to the outer casing, whereby the total area for the passage of water is not less than the available area through the diffusion blades 18. Aside from the connection of the inner body 9 to the outer body or casing 8, provided by the man-hole 15, there are in the plane of the man-hole three bracket supports 32, tightly fitting between said inner body and the outer casing and through which, clamping bolts 33 pass, so that the said parts are rigidly bolted together. These three supports for the inner body are preferably arranged in the lower half of the pump, so that they not only sustain the lateral thrust, but support the main weight of the inner body and the thrust bearing contained therein. At the forward end of the inner body 9 and arranged between it and the outer casing, is the annular diffusion blade ring 18 which is provided with the diffusion blades, as indicated in Figs. 2 and 5, said blades being employed for the purpose of intercepting the rotating body of water passing through the pump and changing its rotation into a more or less rectilinear motion on leaving the diffusion blades. As shown, the diffusion blade ring is in effect a structure with an inner ring and an outer shroud ring connected by the blades, and this diffusion ring as a whole is set into annular recesses upon the outside of the inner body 9 and the inside of the outer body or casing 8, so that it is positively held in place. Furthermore, this diffusion ring structure acts as a strong brace between the inner body 9 and the outer body 8 at the forward end of the chamber 13, and accurately positions the bearing 25 carried within the chamber 13 in respect to the outer casing in which the impeller or rotor is required to revolve. As shown, this bearing 25 is secured centrally in the chamber 13 and supported from the lower part of the inner body 9 by the bed 34 extending upwardly therein, and preferably integral therewith. This bearing is therefore in transverse alinement with the diffusion ring 18, and consequently we have a most rigid centralizing construction for the shaft 24 which is carried in said bearing 25. The blades of the diffusion ring may be modified with a view that the ring acts more as an annular brace for centralizing the inner body and the bearings contained therein, but in commercial practice I prefer that this annular ring shall contain diffusion blades for changing the rotary motion of the water into a longitudinal motion. The rear end of the shaft 24 is formed as part of a thrust bearing 26 of well known construction, the shaft having the usual collars revolving between thrust bearing portions, and the whole being freely lubricated. The particular character of this thrust bearing is immaterial, but I have shown it in the form I prefer in actual commercial use of my invention. This thrust bearing is carried by a base bracket 35 formed integrally with the inner body 9 and extending upward from the lower portion thereof above the lower brace 33, so as to position the thrust bearing in the central axial line of the pump. A floor 27 may be provided on each side of the bearings 25 and 26, upon which the workmen may stand in giving attention to the bearings of the pump when necessary. The forward end of this inner body 9 is, as before stated, more or less flattened, but preferably somewhat conical, as at 11, for strength, and the central portion of this end, as before stated, with a stuffing-box 12 surrounding the shaft 24 close to the main bearing 25, said stuffing-box acting to keep the water out of the chamber 13.

The shaft 24 extends from the bearings 25 and 26 horizontally through the intake portion of the pump, and is supported in an outside bearing 31 of any suitable construction. The shaft extends through a stuffing-box 30 in the intake of the pump, and is protected by a tubular casing 29 arranged about it, which performs the function of not only preventing the rotation of the shaft affecting the water, but keeping the water and its contents from directly rushing against the shaft and also providing a stationary surface against which the water and any suspended matter may pass with a minimum disturbance. Furthermore, this tubular part 29 directly acts to support the conical guide 28 for forming a conical annular passage for leading the water to the rotor or impeller 20 which is secured to and revolves with the shaft 24. The impeller 20 consists of a ring structure which is clearly illustrated in Figs. 2 and 4, and is secured to the shaft by a strong hub 19. The inner walls 21 and the outer walls 22 of the water passage through the impeller, are each preferably conical, but form an angle with respect to each other, so that the area of the impeller at the intake side is the same as the area at the discharge side, the object of which is to permit the water under centrifugal force to more freely pass through the impeller and to provide the same cross sectional area of passage through which the water flows from the time it enters the impeller to the time it leaves said impeller. This feature has been previously referred to in Letters Patent No. 1,055,588, granted to me on March 11, 1913. I, however, do not restrict myself to the particular form and proportions of the impeller here shown and described. The shroud ring 22 of the impeller is preferably made with a groove in which a tension band 23 may be clamped in place to impart strength, this being especially desirable where the metal of the impeller is of brass or bronze. The shroud ring 22 providing the outer wall of the water passage is arranged to revolve in an annular recess 17$^a$ in the casing 8, as clearly illustrated in Fig. 2. If desired, a lubricant may be supplied to the annular recess 17$^a$ through a pipe 41. To insure a good mechanical fit, and to compensate for any wear, as well as providing a material which will not corrode, the shroud ring of the impeller may revolve between annular wearing strips 17$^b$ and 17$^c$, which may be of brass or bronze and secured within the recessed portion 17$^a$ of the casing. The inner conical face 21 of the water passage in the impeller is in alinement with the surface of the conical guide 28, so that the water is guided freely into the impeller. Likewise, the outer conical face 22 of the water passage in the impeller is in alinement with the interior conical wall of the part 17 of the casing which forms the annular conical chamber 17 between the impeller and the different blades 18, this construction providing the least resistance to the flow of the water and insuring a high efficiency of the pump as a whole.

As the impeller is required to revolve at a relatively high rate of speed, and is acting upon a highly resisting substance, water, it is most important that the support or bearing on the end of the impeller shaft shall be most rigid, and from what I have already described, it will be apparent that the arrangement of the bearing 25 close to the impeller and so rigidly braced centrally of the outer casing, will insure the proper operation of the impeller in respect to its co-acting parts to enable close fits to be had without undue wear.

While a pump of the construction here illustrated is a very large piece of apparatus, it is to be understood that the same general principles of construction may be employed in pumps of smaller size, and I therefore do not restrict myself to details which are incident to size rather than general construction. Furthermore, it will be understood, that while the chamber 13 is intended normally to be a closed chamber containing air, this chamber may, if desired, be filled with lubricant; but in any event, no water is allowed to find its way therein.

This pump may be employed in any relation where its use may be found convenient, either at the bottom of the pipe line or in a submerged condition, or in fact, any manner where a circulation of the water is required, but in the preferred use, it is preferably arranged as indicated in Fig. 1, that is to say, in which the pump with its intake and outlet form a pipe siphon; and this is put into operation by the use of the vacuum creating means for exhausting the pump above the two water levels, of the air contained therein, so that the water will fill the pump and be positively propelled through the water passage thus provided in the opposite direction to what would be the natural flow of the water if the apparatus were left in a static condition and permitted to act as a siphon. This operation of propelling the water in the opposite direction to what would be the natural flow upon completing a siphon, would result from the fact that the level of the water in the conduit 2 is lower than the level of the water in the discharge conduit or canal 3, where the action of gravity is made use of for conveying the water to a distant place.

By arranging the bearings 31 and 25 at a great distance apart, the shaft 24 is held in exact alinement with the axis of the pump, and as the end of the shaft terminates in the chamber 13 close to the impeller and is there thoroughly supported by powerful bearings, it is manifest that the most perfect running of the impeller is insured, as there will be no undue vibration of the shaft possible. Furthermore, by having the thrust bearing 26 close to the main bearing 25 and also adjacent to the impeller, it will be understood that there is no great length of shaft between the said thrust bearing and the impeller which might spring under the thrust action. Moreover, by putting the thrust bearing within the chamber 13 on the discharge side of the impeller, the shaft 24 is subjected to tension instead of compression, and consequently there is a steadier action than if said thrust bearing were arranged in the line of the shafting beyond the bearing 31 outside of the pump.

I furthermore desire to be understood that while it is the primary object to have the inner chamber kept clear of water, I do not restrict myself in this respect because clear water or a suitable fluid might be admitted into this chamber to keep the bearings cool and lubricated while no grit, slime and dirt of the main body of water being pumped gain access thereto.

While I have shown the construction of my improved pump in that form, as to details, which I have found most satisfactory in practice, I do not restrict myself to the minor details, as these may be modified in various ways without departing from the spirit of the invention.

Having now described my invention, what I claim as new and desire to secure by Letters Patent, is:—

1. In a screw pump, an outer tubular casing having an inlet and an outlet at opposite ends, combined with an inner body forming an inclosed chamber and rigidly positioned centrally of the casing and having an axially arranged stuffing-box, a line bearing secured within the chamber of the inner body, a line bearing positioned exterior to the chamber of the inner body, an impeller shaft extending through the stuffing-box and journaled in the line bearings within and without the inner body, a hub secured to the impeller shaft outside of the inner body and close to the stuffing-box and arranged between the two bearings, and impelling blades secured to the hub.

2. The combination of supply and discharge conduits arranged to respectively contain water at different levels, a screw pump supported at a level above the water in the supply conduit and having an intake passage leading downward from the pump and opening into the conduit below the water level therein and also arranged to discharge into the discharge conduit, an inner closed hollow body centrally arranged in the casing to provide an annular water passage between it and the casing of the pump provided with a stuffing-box at one end, bracing means between the casing and the inner body and extending across the annular water passage for the purpose of rigidly holding the hollow body in central position, an impeller shaft extending through the stuffing-box and into the chamber of the closed hollow body, an impeller carried by the shaft outside of the closed hollow body and beyond the stuffing-box, and a bearing for the shaft arranged within the chamber of the closed hollow body and shielded thereby.

3. In a screw pump, the combination of an outer casing having at one end an intake passage and at the other end a discharge passage, an inner body arranged within the outer casing forming an annular water passage between the said casing and body and provided at one end with a stuffing-box said chamber also having centrally therein a line bearing, a tubular manhole opening from the chamber within the inner body to the outside of the casing, rigid braces between the outer casing and the inner body arranged in the annular water passage for rigidly securing the inner body in position, an impeller shaft journaled in the bearing in the inclosed chamber and extending through the stuffing-box thereof, and an impeller secured to the shaft adjacent to the end of the inner body and having an annular conical passage for water provided with impelling blades for forcing the water through the annular passage between the inner body and the outer casing.

4. In a screw pump, the combination of an outer casing having at one end an intake passage and at the other end a discharge passage, an inner body arranged within the outer casing forming an annular water passage between the said casing and body and provided at one end with a stuffing-box said chamber also having centrally therein a line bearing, a thrust bearing also arranged within the chamber of the inner body and in axial alinement with the line bearing and stuffing-box, a tubular manhole opening from the chamber within the inner body to the outside of the casing, rigid braces between the outer casing and the inner body arranged in the annular water passage for rigidly securing the inner body in position, an impeller shaft journaled in the bearing in the inclosed chamber and extending through the stuffing-box thereof and having its end adapted to coöperate with the thrust bearing, and an impeller secured to the shaft adjacent to the end of the inner body and having an annular conical passage for water provided with impelling blades for forcing the water through the annular passage between the inner body and the outer casing.

5. In a screw pump, the combination of an outer casing having at one end an intake passage and at the other end a discharge passage, an inner body arranged within the outer casing forming an annular water passage between the said casing and body and provided at one end with a stuffing-box said chamber also having centrally therein a line bearing, a tubular manhole opening from the chamber within the inner body to the outside of the casing, rigid braces between the outer casing and the inner body arranged in the annular water passage for rigidly securing the inner body in position, an impeller shaft journaled in the bearing in the inclosed chamber and extending through the stuffing-box thereof, an impeller secured to the shaft adjacent to the end of the inner body and having an annular conical passage for water provided with impelling blades for forcing the water through the annular passage between the inner body and the outer casing, and an annular diffusion ring tightly fitting between the outer casing and the inner body and centralizing the latter within the outer casing said diffusion ring having blades for causing the rotating water which leaves the impeller to flow in a more or less longitudinal direction through the annular passage of the pump.

6. In a screw pump, the combination of an outer casing having at one end an intake passage and at the other end a discharge passage, an inner body arranged within the outer casing forming an annular water passage between the said casing and body and provided at one end with a stuffing-box said chamber also having centrally therein a line bearing, a tubular man-hole opening from the chamber within the inner body to the outside of the casing, rigid braces between the outer casing and the inner body arranged in the annular water passage for rigidly securing the inner body in position, an impeller shaft journaled in the bearing in the inclosed chamber and extending through the stuffing-box thereof, an impeller secured to the shaft adjacent to the end of the inner body and having an annular conical passage for water provided with impelling blades for forcing the water through the annular passage between the inner body and the outer casing, and a fixed conical water guide portion arranged around the hub part of the impeller and having its larger diameter in alinement with the impeller surface said guide supported by a tubular extension surrounding the impeller shaft.

7. In a screw pump, the combination of the outer casing having a conical end communicating with the intake pipe and having its other end connecting with the discharge pipe, an inner body portion providing an inclosed chamber, an annular diffusion ring having a plurality of diffusion blades surrounding the inner body and supported by the outer casing, a line bearing and stuffing-box arranged centrally in alinement within the chamber of the inner body, an impeller shaft extending through the stuffing-box and supported in the line bearing, and an impeller comprising a structure having an annular tapered passage provided with impelling blades said impeller fitting the casing and its perimeter so formed as to constitute a continuation of the tapered end of the casing.

8. In a screw pump, a cylindrical casing having an inlet and an outlet at opposite ends, combined with an inner body forming an inclosed chamber and rigidly positioned centrally of the casing so as to provide an annular water passage between the inner body and the casing said inner body having its end next to the inlet flattened and provided with a centrally arranged stuffing-box and further provided within its chamber with a line bearing, an impeller shaft extending through the stuffing-box and journaled in the line bearing within the chamber of the inner body and terminating in said chamber, a hub secured to the impeller shaft and arranged close to the flattened end of the inner body and provided with an annular impeller ring having an annular shroud and impelling blades within the shroud and between it and the hub, and a stationary conical guide on the inlet end terminating close to the impeller adjacent to its hub.

9. In a screw pump, a cylindrical casing having an inlet and an outlet at opposite ends and having an annular recess about the inlet end provided with means for introducing a lubricant, combined with an inner body forming an inclosed chamber and rigidly positioned centrally of the casing so as to provide an annular water passage between the inner body and the casing said inner body having its end next to the inlet flattened and provided with a centrally arranged stuffing-box and further provided within its chamber with a line bearing, an impeller shaft extending through the stuffing-box and journaled in the line bearing within the chamber of the inner body and terminating in said chamber, a hub secured to the impeller shaft and arranged close to the flattened end of the inner body and provided with an annular impeller ring having an annular shroud and impelling blades within the shroud and between it and the hub said shroud having a channel-shaped cross section providing an annular groove about the perimeter of the impeller and fitting into the annular recess of the casing, and a stationary conical guide on the inlet end terminating close to the impeller adjacent to its hub.

10. In a screw pump, a cylindrical casing having an inlet and an outlet at opposite ends, combined with an inner body forming an inclosed chamber and rigidly positioned centrally of the casing so as to provide an annular water passage between the inner body and the casing said inner body having its end next to the inlet flattened and provided with a centrally arranged stuffing-box and further provided within its chamber with a line bearing, an impeller shaft extending through the stuffing-box and journaled in the line bearing within the chamber of the inner body and terminating in said chamber, a hub secured to the impeller shaft and arranged close to the flattened end of the inner body and provided with an annular impeller ring having an annular shroud and impelling blades within the shroud and between it and the hub, annular wearing plates fitting into the ends of the recess of the casing and between which the shroud of the impeller fits, and a stationary conical guide on the inlet end terminating close to the impeller adjacent to its hub.

11. In a screw pump, the combination of a cylindrical outer casing, an inner hollow body centrally arranged in the casing to provide an annular water passage between it and the casing said inner body provided with a stuffing-box at one end, radial bracing means between the outer casing and the inner body and extending across the annular water passage for the purpose of rigidly holding the body in central position and taking the downward and lateral thrust thereof, an impeller shaft extending through the stuffing-box and into the chamber of the body, an impeller carried by the shaft, and a thrust bearing for the shaft arranged within the chamber of the inner body and supported above the radial bracing means.

12. In a screw pump, the combination of a cylindrical outer casing, an inner hollow body centrally arranged in the casing to provide an annular water passage between it and the casing said inner body provided with a stuffing-box at one end, radial bracing means between the outer casing and the inner body and extending across the annular water passage for the purpose of rigidly holding the body in central position and taking the downward and lateral thrust thereof near one end, an annular ring structure arranged between the inner body and the outer casing near the other or forward end of the body adjacent to the stuffing-box whereby said body is rigidly supported against movement in all radial directions, a line bearing rigidly secured within the body in transverse alinement with the annular ring structure, an impeller shaft extending through the stuffing-box and into the chamber of the body and supported in the line bearing, an impeller carried by the shaft, and a thrust bearing for the shaft arranged within the chamber of the inner body and supported above the radial bracing means.

13. In a screw pump, the combination of the casing providing an annular water passage, a rotating shaft and an impeller secured to the shaft comprising a hub having a channel-shaped shroud and intermediate impeller blades, and a reinforcing band arranged in the channel-shaped groove of the shroud.

14. In a screw pump, the combination of a cylindrical outer casing, an inner closed hollow body centrally arranged in the casing to provide an annular water passage between it and the outer casing said inner hollow body provided with a stuffing-box at one end, bracing means between the outer casing and the inner body and extending across the annular water passage for the purpose of rigidly holding the hollow body in central position, an impeller shaft extending through the stuffing-box and into the chamber of the body, an impeller carried by the shaft outside of the closed hollow body and beyond the stuffing-box, and a bearing for the shaft arranged within the chamber of the inner hollow body.

15. In a screw pump, a cylindrical casing having an inlet and an outlet at opposite ends, combined with an inner body forming an inclosed chamber and rigidly positioned centrally of the casing so as to provide an annular water passage between the inner body and the casing said inner body having its end next to the inlet provided with a centrally arranged stuffing-box and further provided within its chamber with a line bearing, an impeller shaft extending through the stuffing-box and journaled in the line bearing within the chamber of the inner body, and a hub secured to the impeller shaft and arranged close to the end of the inner body and provided with an annular impeller ring having screw shaped impelling blades.

16. In a screw pump, the combination of an outer casing having at one end an intake passage and at the other end a discharge passage, an inner body arranged within the outer casing forming an annular water passage between the said casing and body and provided at one end with a stuffing-box said chamber also having centrally therein a bearing, a tubular man-hole opening from the chamber within the inner body and extending across the annular water passage to the outside of the casing to provide access to the chamber while the pump is in operation, an impeller shaft journaled in the bearing in the inclosed chamber and extending through the stuffing-box thereof, and a screw impeller secured to the shaft and arranged adjacent to the end of the inner body.

In testimony of which invention, I hereunto set my hand.

ALBERT BALDWIN WOOD.

Witnesses:
  JOHN C. BARTLEY,
  ALFRED RAYMOND.